E. WATERS.

Paper-Vessel.

No. 6,627.

Reissued Aug. 31, 1875.

*Attest:*

Wm. Bagger

C. A. Snow.

*Inventor*

Elisha Waters, by Wm. Bagger

Atty

UNITED STATES PATENT OFFICE.

ELISHA WATERS, OF TROY, NEW YORK.

IMPROVEMENT IN PAPER VESSELS.

Specification forming part of Letters Patent No. 81,441, dated August 25, 1868; reissue No. 6,627, dated August 31, 1875; application filed April 5, 1875.

*To all whom it may concern:*

Be it known that I, ELISHA WATERS, of Troy, in the county of Rensselaer and State of New York, have invented certain new and useful Improvements in Paper Vessels; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to certain improvements in hermetically-sealed packages for holding and transporting petroleum and its products, spirits of turpentine, and other liquids of a volatile nature, by which all loss by leakage or evaporation, and its resultant dangers, is prevented; and it consists, first, in forming a paper vessel supported internally by end hoops or a wooden shell; and, second, in surrounding said paper vessel with an exterior protecting envelope or covering, all in the manner and for the purpose hereinafter more fully set forth.

Figure 1:
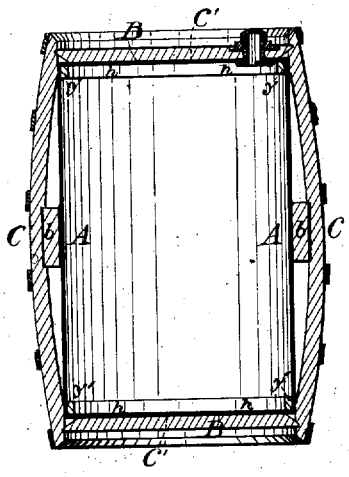
Figure 3:
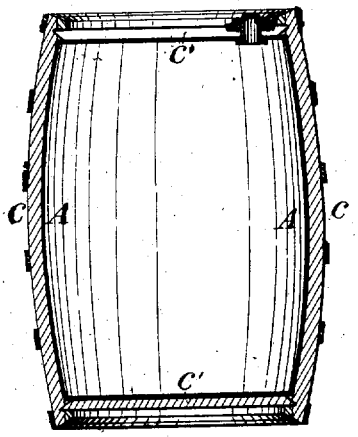
Figure 2:
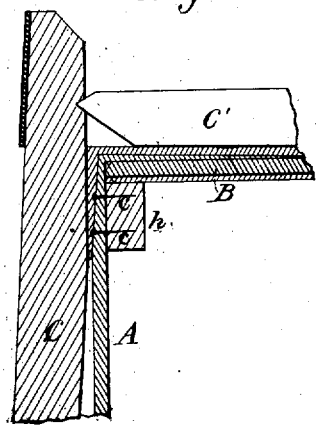
Figure 4:
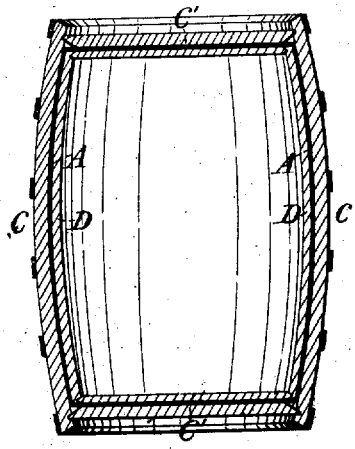

In the drawing, Figure 1 represents a vertical section of a paper vessel supported by internal end hoops, and having an exterior wooden case or envelope. Fig. 2 represents a vertical section taken through a corner of the package, shown in Fig. 1; and Figs. 3 and 4 are modifications of my invention, which will be described hereinafter.

Similar letters of reference indicate corresponding parts in all the figures.

A is a vessel made from paper-pulp, paper in sheets, paper or straw board, or vegetable parchment of any suitable kind or quality, which is supported internally by end hoops *h*, inserted a little below the chine, as shown in Fig. 2, so as to afford an annular rest or support for the heads B. The hoops are set in glue or other cementing substance, and secured in place by heavy tacks *c*, driven from the outside, but not through. C is the exterior protecting case or envelope, and C′ are the heads of the latter.

When the interior vessel A is cylindrical, and the case C barrel-shaped or bulging, as shown in Fig. 1, a band of wood, (shown at *b*,) made up of three or four pieces cut from the solid, is firmly glued or otherwise cemented to the exterior of the paper vessel, so as to abut or impinge upon the inside bulging part of the wooden case, and form a central support.

The shape of the interior vessel A is not material; it may be cylindrical, or tank-like, or barrel-shaped, as occasion and circumstances may require. Nor is the method or process of manufacture of the vessel A material, for, as already stated, it may be made from paper-pulp, paper in sheets, or paper or straw board, and the mode of manufacture will, of course, depend upon the character of the material used. But the interior of the paper vessel must be coated with copal, shellac, common glue, marine glue, or other substance or composition selected to form the inner resisting surface to the liquid to be contained therein; or the whole fiber of the paper vessel may be permeated with any known varnish, or other substance or compound insoluble in and suited to effectually resist the action and prevent the leakage of the particular fluid the vessel is prepared to contain.

The heads B are prepared by lining a circle of straw-board or thin wood, of the proper size, with paper, as shown in Fig. 2. A suitable opening is made for the screw-plug, after which it is closely fitted in place and bedded on the hoop with the resisting material. After the heads have been inserted, the vessel A is ready for setting up the rough barrel or envelope C around it.

Where A is a cylinder and the casing C barrel-shaped, as in Fig. 1, the latter is made in the usual manner, but with the inner surface terminating at each end in a short cylinder, (shown at *g g′*,) for the purpose of supporting the ends of the cylindrical paper vessel within. The latter is further sustained by the belt of wood *b*, placed midway between the ends, and between the inner surface of the barrel and the outer surface of the paper cylinder, as already described. But where the interior vessel is barrel-shaped, as in Figs. 3 and 4, the inside vessel may be secured to its outer case by securing detached portions of its outer surface by glue or other cementing substance, to corresponding portions of the inner surface of the enveloping barrel in narrow strips, parallel to the joints of the staves, and occurring on every alternate or every third or fourth stave, as may be found sufficient, but of such width and so placed that in no case shall any motion of the edges of the staves on each other injuriously affect the paper beneath, which must invariably have freedom of motion inward along these joints.

In Fig. 4 is represented a compound paper and wooden inside vessel, covered and protected by an exterior casing, C. The paper is affixed to the outside casing in the manner already described, so that, while the inside vessel cannot move within the wooden envelope, it shall be independent of the casing along the edges or joints of its staves, so that whenever any one stave shall be sprung inward beyond the next one, the interior vessel shall yield freely without injury to itself, or the loss of any of its contents.

To apply this invention to wooden tanks or cisterns, I build up with continuous sheets of paper or straw board, extending entirely around the inner surface, and breaking joints with each other, a solid lining of paper, these layers being alternated with the layers forming the lining for the bottom and top edges, so as to form perfect laps. The sheets next the wood are tacked in place, or they may be glued or otherwise cemented to the inner face of the staves, leaving the paper entirely free along the joints, as already fully described hereinbefore, where barrels are used as protecting envelopes for barrel-shaped paper vessels, and a few tacks are driven through the succeeding ones into those below and into the wood, to insure the paper shell remaining in place when the tank or cistern is empty. The last two layers are simply attached to those below with the adhesive composition used, no tacks being driven through them. These closed vessels may also be formed from paper-pulp pressed into molds, giving a shell of the form of a truncated cone, or any other shape of surface that will fit one-half or other fractional part of the barrel, cask, or other vessel intended to surround and protect it.

As regards the first part of my invention, it is essential that the paper vessel should be supported internally by end hoops or disks, or an extended shell, substantially as hereinbefore described; and in respect to the second part of my invention, it is commonly preferable, but not essential, that the paper vessel should be supported by the internal end hoops or shell. But it is indispensable to that part of my invention that, while the paper vessel must be fitted so closely in, or so attached to, the outer wooden case as not to turn within the latter by any ordinary handling, transportation, and use of the complete vessel, yet the paper vessel must be free or separate from, or not adhere to, the wooden case along the joints of its staves, so that the paper vessel will be less liable to be ruptured or injured by a stave being forced in beyond those next to it than if the whole outer surface of the paper vessel were firmly glued to the entire inner surface of the wooden case, or if the paper vessel were cemented to the outer one along the joints of the staves.

Having thus described my invention, I claim and desire to secure by Letters Patent of the United States—

1. A closed cylindrical, tank-like, or barrel-shaped vessel, formed essentially or mainly from paper-pulp, paper in sheets, or paper or straw board of any suitable quality, and supported internally by hoops *h*, or by an extended wooden shell, D, substantially as and for the purpose herein shown and described.

2. The combination of a closed cylindrical, tank-like, or barrel-shaped vessel, formed essentially or mainly from paper-pulp, paper in sheets, or paper or straw board of any suitable quality, with or without internal end hoops, supporting-disks, or an extended wooden shell, with an exterior protecting case or covering, substantially in the manner and for the purpose hereinbefore set forth.

3. The combination of a cylindrical, tank-like, or barrel-shaped vessel, formed essentially or mainly from paper-pulp, paper in sheets, or paper or straw board of any suitable quality, and having interior end hoops *h h*, with the disks or heads B, resting upon and affixed to said hoops, substantially as and for the purpose herein shown and described.

In testimony that I claim the foregoing I have hereunto set my hand this 18th day of January, 1875.

ELISHA WATERS.

Witnesses:
LOUIS BAGGER,
WM. BAGGER.